INVENTOR
BURTON S. ZELLER
ATTORNEY

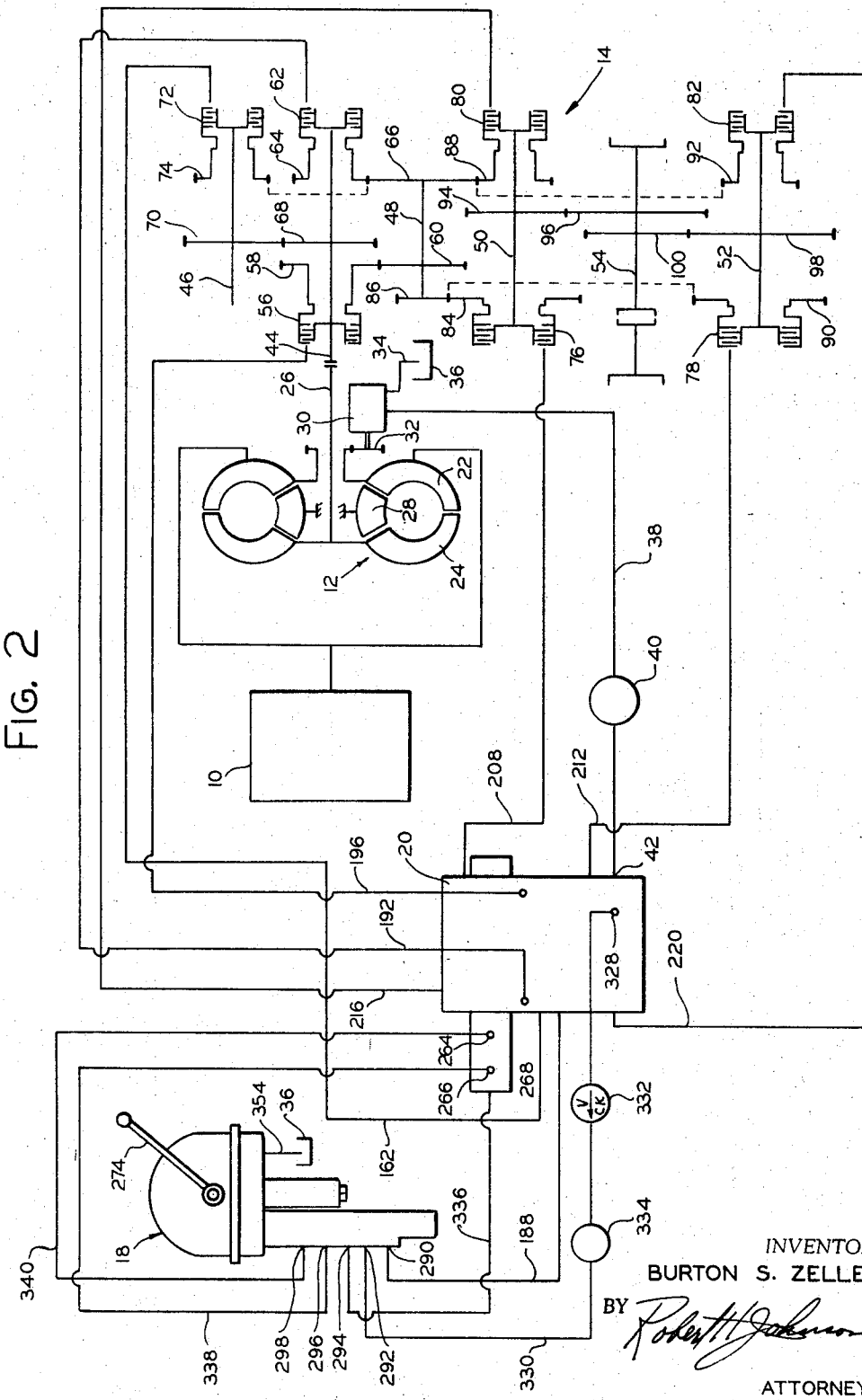

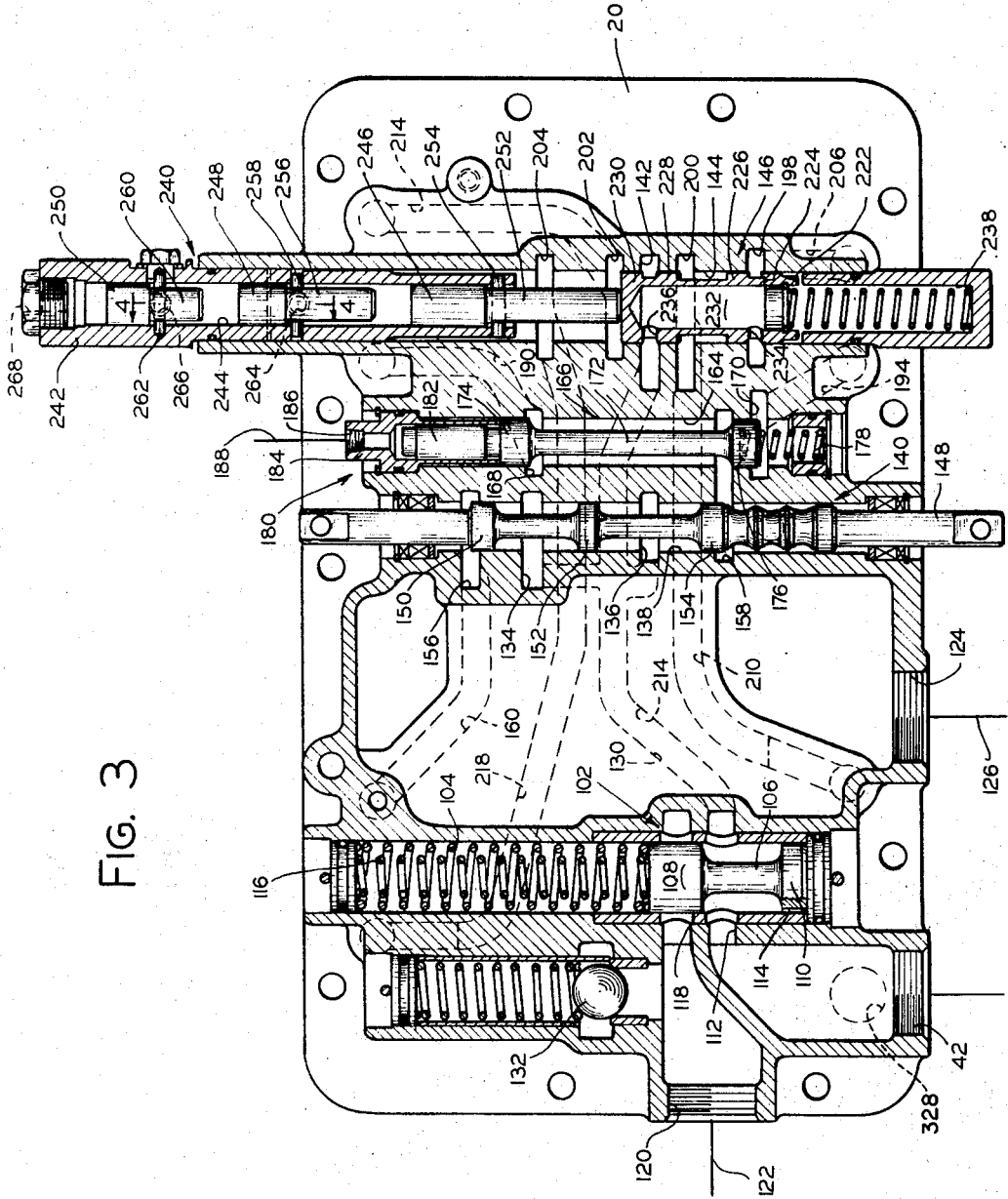

INVENTOR
BURTON S. ZELLER
ATTORNEY

United States Patent Office 3,344,679
Patented Oct. 3, 1967

3,344,679
TRANSMISSION CONTROL SYSTEM
Burton S. Zeller, Parma, Mich., assignor to Clark Equipment Company, a corporation of Michigan
Filed Apr. 9, 1965, Ser. No. 446,932
10 Claims. (Cl. 74—360)

ABSTRACT OF THE DISCLOSURE

A manually operable hydraulic control system for multi-speed transmissions having a low and high range and a plurality of speed ratios, the system being operable to sequentially engage the low and high range for each speed ratio.

---

Multi-speed transmissions having a large number of different forward and reverse speeds are in common use today. Such transmissions often have a complicated shift pattern, and so require a skilled operator to use them. Thus, a principal object of my invention is to provide a transmission control with a simplified shift pattern.

A further object of my invention is to provide an improved and simplified control system for fluid power shifted transmissions.

Another object of my invention is to provide for use with a transmission control system a master control having a control handle which is actuatable reciprocably in a single plane for selecting all the different transmission speeds.

In carrying out my invention in a preferred embodiment thereof, I provide a speed ratio clutch control valve which is movable to different positions to control engagement of the various speed ratio clutches of the transmission. This valve is moved to the different positions by means of a multi-position fluid actuator. The transmission is shifted between low and high ranges by alternate engagement of a pair of range clutches which are controlled by a range selection valve which is movable to a low range position and a high range position and shifted between these two positions by a fluid actuator. Also, there is a direction control valve having a neutral position, a reverse position and a forward position. In the reverse position of the direction control valve, the fluid supply to the range valve is cut off. The fluid actuators for the speed ratio valve and the range valve are connected to a master control which is operable to energize the actuators so that a first speed ratio clutch is engaged and a low range clutch is engaged, then the high range clutch is engaged while the first speed ratio clutch remains engaged, then a second speed ratio clutch is engaged and the low range clutch is re-engaged, then the high range clutch is re-engaged while the second speed ratio clutch remains engaged. This sequence of clutch engagement and disengagement continues for as many speed ratio clutches as the transmission has.

Figure 1:
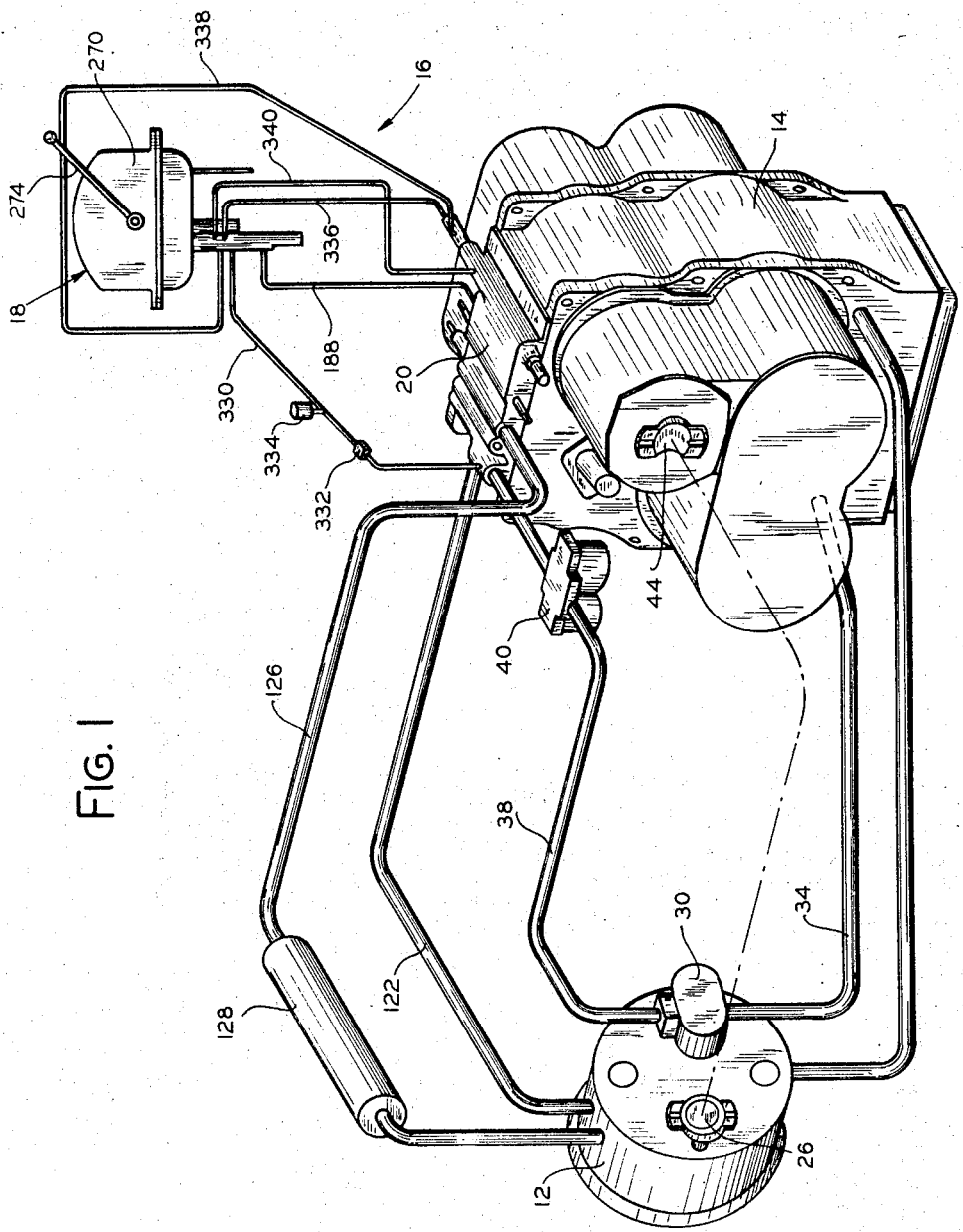
Figure 5:
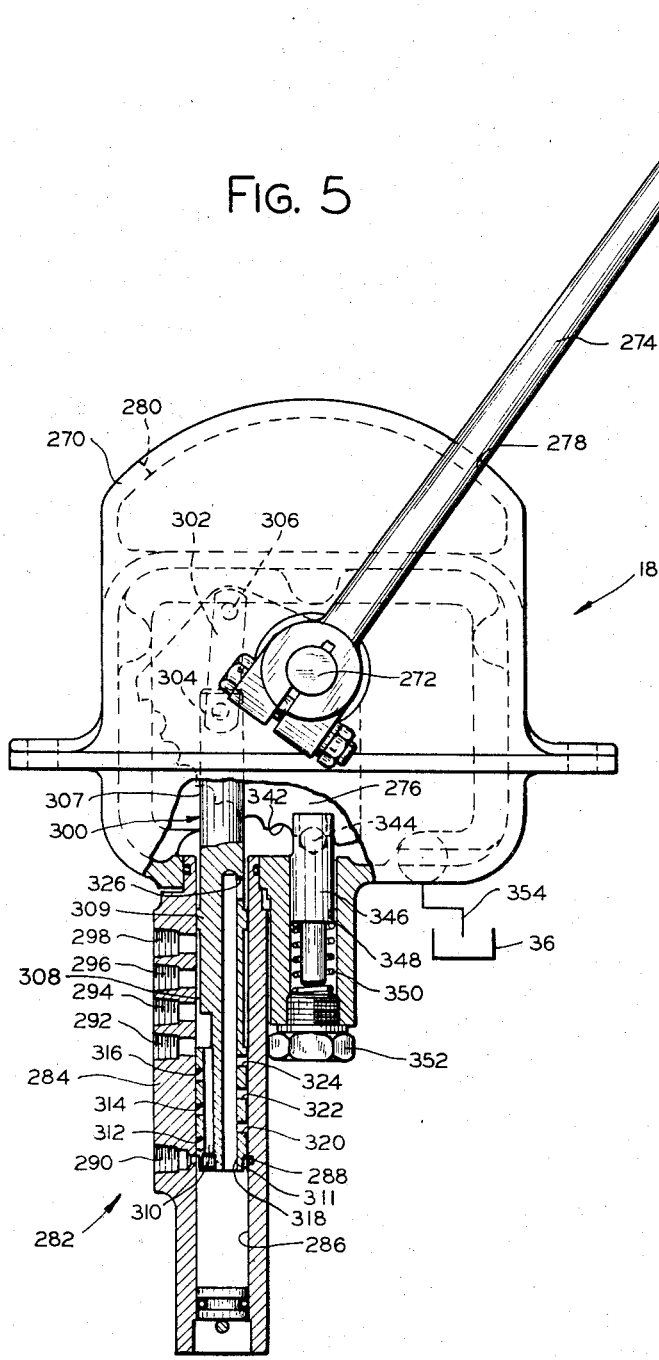
Figure 4:
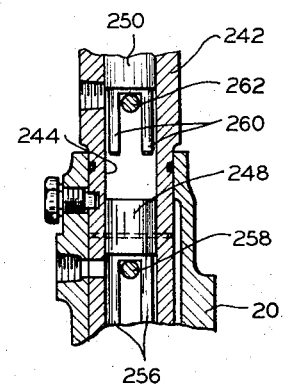

The above and other objects, features and advantages of my invention will become more apparent to one skilled in the art when the following detailed description is taken in conjunction with the accompanying drawing wherein:

FIGURE 1 is a schematic showing of my control system in conjunction with a suitable transmission and a hydrodynamic torque converter, FIGURE 2 shows diagrammatically my control system in conjunction with the same transmission and hydrodynamic torque converter shown in FIG. 1, FIGURE 3 is a horizontal section through a valve cover plate which forms a portion of my invention, FIGURE 4 is a cross-section taken along line 4—4 through a portion of the multi-position actuator, and FIGURE 5 is a partial sectional view of the master operator controller.

Referring to FIGS. 1 and 2, there is shown a prime mover 10 (FIG. 2) which drives a hydrodynamic torque converter 12 which in turn drives a multi-speed gear transmission 14. Shifting of transmission 14 is governed by a control system 16 which includes a master operator controller 18 and a bank of valves disposed in a control cover plate 20.

Torque converter 12 includes an impeller member 22 connected to prime mover 10, a turbine member 24 which is connected to an output shaft 26 and a stationary reaction member 28. The impeller, turbine and reaction members form a toroidal chamber which is filled with fluid, the fluid reacting with the three members to form a driving connection between the impeller and turbine members as is well known to those skilled in the art. A fluid pump 30 is mounted on torque converter 12 and is drivingly connected to impeller member 22 by means of a gear train 32. Pump 30 draws fluid through a conduit 34 from a sump 36 located in the bottom of the casing a transmission 14 and then directs pressurized fluid through a conduit 38 which contains a fluid filter assembly 40 to a port 42 (FIG. 3) in cover plate 20.

Output shaft 26 of torque converter 12 is connected to the input shaft 44 of transmission 14 and is disposed so that the axes of output shaft 26 and input shaft 44 are substantially parallel, although torque converter 12 is shown turned somewhat in FIG. 1 in order better to illustrate the various parts of the drive train.

Transmission 14 is a constant mesh gear transmission with fluid actuated disc clutches for connecting certain of the gears to certain of the shafts to provide various transmission speeds. Transmission 14 is arranged to provide eight forward speeds and four reverse speeds. More specifically, transmission 14 includes, in addition to input shaft 44, a reverse shaft 46, an idler shaft 48, a pair of countershafts 50 and 52 and an output shaft 54. A high range clutch 56 is carried by input shaft 44 adjacent one end thereof and has a gear 58 connected thereto. Gear 58 meshes with another gear 60 which is fixed to idler shaft 48. Also carried by input shaft 44 is a low range clutch 62 to which a gear 64 is connected. Gear 64 meshes with another gear 66 fixed to idler shaft 48. A gear 68 is fixed to input shaft 44 and meshes with another gear 70 which is fixed to reverse shaft 46. Reverse shaft 46 carries a reverse clutch 72 to which a gear 74 is connected. Gear 74 meshes with gear 68.

Also included in transmission 14 is a first speed ratio clutch 76, a second speed ratio clutch 78, a third speed ratio clucth 80 and a fourth speed ratio clutch 82. First and third speed ratio clutches 76 and 80 are carried by countershaft 50. First speed ratio clutch 76 has a gear 84 connected to it which meshes with another gear 86 fixed to idler shaft 48. Similarly, third speed ratio clutch 80 has a gear 88 connected to it which meshes with gear 66. Second speed ratio clutch 78 and fourth speed ratio clutch 82 are carried by countershaft 52. Second speed ratio clutch 78 has a gear 90 connected to it which meshes with gear 86. Similarly, fourth speed ratio clutch 82 has a gear 92 connected to it which meshes with gear 66. Fixed to countershaft 50 is a gear 94 which meshes with another gear 96 that is fixed to output shaft 54. Similarly, a gear 98 is fixed to countershaft 52 and meshes with another gear 100 which is fixed to output shaft 54.

At this point it will be understood that the various clutches may be engaged by supplying them with pressurized fluid. Engagement of the various clutches causes the gear which is connected to the respective clutch to be fixed to the shaft which carries the clutch for conjoint rotation therewith. Further, power is transmitted through transmission 14 by engaging either the low range clutch 62, the high range clutch 56 or the reverse clutch 72 and one of the four speed ratio clutches 76, 78, 80 and 82. For a more detailed explanation of a transmission which is similar to the present transmission, except for the addition of the high range clutch 56, see U.S. Patent No. 3,126,752 issued March 31, 1964, in the name of R. H. Bolster.

The control system 16 will now be described in detail, including the specifics of the main component parts thereof, namely, the master operator controller 18 and the bank of valves contained within control plate 20.

Referring now also to FIG. 3, it will be seen that disposed in cover plate 20 is a regulating valve 102. Regulating valve 102 includes a bore 104 to cover plate 20 and a spool 106 slidably disposed in bore 104, spool 106 having a pair of axially spaced apart lands 108 and 110. Bore 104 is in communication with port 42 by means of a fluid passage 112. Part of the pressurized fluid which is communicated to bore 104 between the lands of spool 106 passes through a fluid passage 114 in land 110 and acts against the bottom end of spool 106 to force it upwardly against the bias of a pair of helical compression springs 116, whereby land 108 uncovers a fluid passage 118 which communicates with a port 120 which in turn is connected to the toroidal chamber of torque converter 12 by means of a fluid conduit 122. After the fluid passes through the toroidal chamber of torque converter 12 it is returned to a port 124 in cover plate 20 by means of a fluid conduit 126 in which is disposed a cooler 128. Fluid that is returned to port 124 is then directed by means of various fluid passages through the transmission to lubricate various gears and bearing points. Also communicating with bore 104 of regulating valve 102 is a fluid passage 130 which supplies pressurized fluid to the other valves contained in cover plate 20, as will be explained in more detail shortly. At this point it will be seen that regulating valve 102 provides fluid passage 130 with pressurized fluid, the maximum pressure of which is regulated preferably at 180–220 p.s.i. Further, regulating valve 102 insures that pressurized fluid under proper pressure is first directed to fluid passage 130 before fluid at a lower pressure is directed to torque converter 12.

It will be noted that fluid passage 118 is supplied with a spring biased ball type safety pressure relief valve 132 which limits the maximum pressure of fluid being supplied to torque converter 12.

Fluid passage 130 communicates directly with a pair of axially spaced apart annular grooves 134 and 136 in the bore 138 of a direction control valve 140 and an annular groove 142 in the bore 144 of a speed ratio clutch control valve 146.

Direction control valve 140 includes an axially slidable spool 148 disposed in bore 138, spool 148 having three axially spaced apart lands 150, 152 and 154. Direction control valve 140 also includes another pair of grooves 156 and 158 which are located outwardly of grooves 134 and 136. Lands 150 and 154 cooperate with grooves 156 and 158, respectively, so that when spool 148 is in the position shown in FIG. 3 pressurized fluid communicated to bore 138 by annular grooves 134 and 136 is blocked from communication with either groove 156 or groove 158. This is the neutral position of spool 148 of direction control valve 140. Now, if spool 148 is shifted upwardly, as viewed in FIG. 3, then pressurized fluid from groove 134 is placed in communication with groove 156 through bore 138 and hence via a fluid passage 160 to another fluid passage 162 (FIG. 2) which directs pressurized fluid to reverse clutch 72, causing it to engage. If spool 148 of direction control valve 140 is shifted downwardly, then pressurized fluid from groove 136 is communicated to groove 158 via bore 138. Pressurized fluid which is communicated to groove 158 is then directed to either a low range or a high range clutch, engagement of either conditioning transmission 14 for forward drive.

As can be seen, groove 158 also communicates with the bore 164 of a range control valve 166. In addition to groove 158 bore 164 includes a pair of axially spaced apart grooves 168 and 170 disposed on opposite sides of groove 158. Slidably disposed in bore 164 is a spool 172 having a pair of axially spaced apart lands 174 and 176. Lands 174 and 176 cooperate with grooves 168 and 170, respectively, to communicate pressurized fluid from groove 158 with either groove 168 or groove 170. Spool 172 is biased upwardly, as shown in FIG. 3, by means of a helical compression spring 178. This is the low range spool position in which pressurized fluid from groove 158 is communicated to groove 168 through bore 164. Spool 172 also can be moved downwardly against the bias of spring 178 to a high range spool position in which groove 158 is placed in communication with groove 170. Such downward movement of spool 172 is accomplished by directly pressurized fluid to a fluid actuator 180 which includes a piston member 182 slidably disposed in cylinder 184, the cylinder 184 including a port 186 which receives pressurized fluid via conduit 188 (FIG. 2).

Groove 168 communicates with a fluid passage 190 which in turn communicates with another fluid passage 192 (FIG. 2) which directs pressurized fluid to low range clutch 62 for engaging it. Similarly, groove 170 communicates with a fluid passage 194 which in turn communicates with another fluid passage 196 (FIG. 2) which directs pressurized fluid to high range clutch 56 for engaging it.

As was pointed out previously, pressurized fluid from regulating valve 102 is supplied via fluid passage 130 to a groove 142 in bore 144 of speed ratio clutch control valve 146. In addition to groove 142 a pair of grooves 198 and 200 are formed in the wall of bore 144 on one side of groove 142 and another pair of grooves 202 and 204 are formed in the wall of bore 144 on the other side of groove 142. Groove 198 communicates with a fluid passage 206 which connects with another fluid passage 208 (FIG. 2) which directs pressurized fluid to first speed ratio clutch 76 for engaging it. In a similar manner groove 200 communicates with a fluid passage 210 which in turn connects with another fluid passage 212 (FIG. 2) which directs pressurized fluid to second speed ratio clutch 78 for egnaging it. Groove 202 communicates with a fluid passage 214 which communicates with another fluid passage 216 (FIG. 2) that directs pressurized fluid to third speed ratio clutch 80 for engaging it. Also, groove 204 connects with a fluid passage 218 which communicates with another fluid passage 220 (FIG. 2) that directs pressurized fluid to fourth speed ratio clutch 82 for engaging it.

Speed ratio clutch control valve 146 also includes a spool 222 slidably disposed in bore 144. Spool 222 includes four axially spaced apart annular lands 224, 226, 228 and 230. Also, spool 222 is hollow, having a chamber 232 therein which is in communication with the groove formed between lands 224 and 226 by means of a fluid passage 234 and is in communication with the groove formed between lands 228 and 230 by means of a fluid passage 236.

Spool 222 has four positions. In the position shown in FIG. 3 pressurized fluid is directed from groove 142 to groove 198 by way of fluid passages 234 and 236 and chamber 232. From groove 198 pressurized fluid is directed to first speed ratio clutch 76 for engaging it. Now, by moving spool 222 slightly upwardly, as shown in FIG. 3, to a second position, lands 226 and 228 cooperate with grooves 142 and 200 to direct pressurized fluid from groove 142 to groove 200 and hence to second speed ratio clutch 78. Further upward movement of spool 222 to a third position brings lands 226 and 228 into cooperation with groove 142 and groove 202 so that pressurized fluid is directed from groove 142 to groove 202 and hence to third speed ratio clutch 80. Finally, additional upward movement of the spool 222 to a fourth position aligns the groove formed between lands 224 and 226 with groove 142 and also aligns the groove formed between lands 228 and 230 with groove 204 so that pressurized fluid from groove 142 is directed via fluid passages 234 and 236 and chamber 232 to groove 204 and from there to fourth speed ratio clutch 82.

At this point it will be seen that starting from the position shown in FIG. 3 and moving spool 222 upwardly causes sequential engagement of the first, second, third and fourth speed ratio clutches, respectively. Also, the various speed ratio clutches are arranged so that they remain engaged only so long as they continue to be supplied with pressurized fluid from groove 142.

Spool 222 of speed ratio clutch control valve 146 is continually biased upwardly toward its fourth operating position by means of a helical compression spring 238 which acts against one end of spool 222, as shown. Spool 222 is held in whichever one of the four operating positions of the valve that is selected by means of a multi-position fluid pressure operated actuator 240 which acts against the end of spool 222 opposite spring 238. Actuator 240 includes a cylinder 242 having a longitudinally extending bore 244 located therein and in which three pistons 246, 248 and 250 are slidably disposed. Piston 246 has a bifurcated portion 252 which straddles a stationary pin 254 that extends across bore 244 and is held in place in cylinder 242. The outer end of bifurcated portion 252 can contact the adjacent end of spool 222 so that movement of piston 246 causes movement of spool 222. Downward movement of piston 246 is limited by pin 254 so that when piston 246 is in abutment with pin 254 spool 222 is in the position shown in FIG. 3. Referring now also to FIG. 4, piston 248 includes a bifurcated portion 256 which straddles a pin 258 held in place in cylinder 242. Also, piston 250 includes a bifurcated portion 260 which straddles a stationary pin 262 that extends across bore 244 and limits the downward movement of piston 250. It will also be noted that bifurcated portion 256 is slightly shorter than bifurcated portion 252 and that bifurcated portion 260 is somewhat shorter than bifurcated portion 256. The significance of this will be explained shortly.

Located in cylinder 242 are three fluid supply ports 264, 266 and 268 which communicate with bore 244. Port 264 communicates with bore 244 between pistons 246 and 248 while port 266 communicates with bore 244 between pistons 248 and 250. Port 268 communicates with bore 244 between piston 250 and the closed end of the bore. Also, ports 264, 266 and 268 are in fluid communication with master controller 18 by means of fluid conduits as will be explained shortly. Master operator controller 18 is arranged so that pressurized fluid is directed to all three of the ports, only ports 266 and 268, only port 268, or none of the ports. With pressurized fluid directed to all of the ports the pistons are disposed as shown in FIG. 3 so that spool 222 is located in the position shown to direct pressurized fluid to first speed ratio clutch 76. By directing pressurized fluid only to ports 266 and 268, spring 238 causes spool 222 and piston 246 to move upwardly until piston 246 comes into abutment with bifurcated portion 256 of piston 248. At this point spool 222 is in the second position in which it directs pressurized fluid to second speed ratio clutch 78. Now, if pressurized fluid is directed only to port 268 spring 238 causes spool 222 to move upwardly until piston 248 is in abutment with bifurcated portion 260 of piston 250, piston 246 being in abutment with bifurcated portion 256 of piston 248. In this position spool 222 directs pressurized fluid to third speed ratio clutch 80. Finally, if pressurized fluid is supplied to none of the ports 264, 266 and 268, then spring 238 causes spool 222 to move upwardly until piston 250 comes into abutment with the closed end of bore 244, pistons 246, 248 and 250 being in abutment with each other. In this situation spool 222 is located so that pressurized fluid is directed to fourth speed ratio clutch 82. Incidentally, the first three positions of spool 222 also can be obtained with actuator 240 by supplying pressurized fluid to only one of the ports at a time.

Referring now to FIG. 5, the master controller 18 will be described in detail. Controller 18 includes a body 270 which is adapted to be mounted at the operator's station of a vehicle with which control system 16 is associated. Journaled for reciprocal pivotal movement in one side of body 270 is a shaft 272 which has a control handle 274 connected to the outer end thereof and a plate 276 connected to the inner end thereof. Movement of control handle 274 between stops 278 and 280 causes a similar movement of plate 276.

Forming a part of master controller 18 is a master control valve 282. The body 284 of master control valve 282 is attached to and extends downwardly from controller body 270 and includes a longitudinally extending bore 286 which has the lower end thereof closed. Formed in the wall of bore 286 is an annular groove 288. Communicating with groove 288 and disposed in valve body 284 is a fluid port 290. Also disposed in body 284 and communicating with bore 286 is a fluid supply port 292 and three fluid actuator ports 294, 296 and 298.

Referring back to FIG. 2 it will be seen that port 290 is connected to port 186 of range actuator 180 by means of fluid conduit 188. Further, pressurized fluid is supplied to port 292 via a fluid conduit 330 which is connected to a port 328 (shown out of its proper plane in FIG. 3) that communicates with port 42. Fluid conduit 330 has disposed therein a one-way check valve 332 which permits fluid flow only toward port 292 and downstream from check valve 332, an accumulator 334. Ports 294, 296 and 298 are connected to ports 268, 266 and 264 of actuator 240, respectively, by means of fluid conduits 336, 338 and 340, respectively.

Slidably disposed in bore 286 of the master control valve is a spool 300, the upper end of which extends into controller body 270 and is connected to plate 276 by means of a rigid link 302 which is pivotally connected at 304 to spool 300 and at 306 to plate 276 so that counterclockwise movement of control handle 274 in a single plane causes spool 300 to move downwardly, as shown in FIG. 5, and clockwise movement of control handle 374 causes spool 300 to move upwardly.

Spool 300 includes a reduced diameter portion 307, an annular groove 308, a land 309 disposed between portion 307 and groove 308 and a reduced diameter portion 311. Annular groove 308 extends partially along the length of spool 300 and is in communication with a longitudinally extending fluid passage 310 in the lower part of spool 300. Disposed in spool 300 and extending between fluid passage 310 and the outer periphery of the spool are three longitudinally spaced apart and radially extending fluid passages 312, 314 and 316. Spool 300 also includes another longitudinally extending fluid passage 318. Three radially extending and longitudinally spaced apart fluid passages 320, 322 and 324 connect fluid passage 318 with the outer periphery of the spool. Also, it will be noted that fluid passage 320 is spaced approximately midway longitudinally between fluid passages 312 and 314. Similarly, fluid passage 322 is located approximately midway longitudinally between fluid passages 314 and 316 and fluid passage 324 is located between fluid passage 316 and groove 308. Thus, as spool 300 moves up or down in bore 286 there is an alternation in communication between fluid passages 310 and 318 with groove 288 via the radially extending fluid passages. Further, there is a radially extending fluid passage 326 which connects fluid passage 318 with the outer periphery of spool 300 on the side of land 309 away from groove 308.

One edge of plate 276 contains a series of notches 342 which cooperate with a spring-loaded ball 344 to function as a detent. Ball 344 is supported in a plunger 346 which is slidably disposed in a bore 348, plunger 346 being biased upwardly by means of a helical compression spring 350 which is held in bore 348 by means of a plug 352 which is threaded into the lower end of bore 348.

In order to enable one to better understand my invention the operation of it will now be explained. It will be assumed that transmission 14 is in neutral in which case direction control valve 140 is in the position shown in FIG. 3 and that the transmission otherwise is conditioned for first speed drive in which case range control valve 166, speed ratio control valve 146 and master controller 18 are in the positions shown in the drawing. Now, it will be assumed that it is desirable to engage transmission 14 for first speed forward and then progressively move from first speed forward to eighth speed forward. With spool 300 of master control valve 282 in the position shown in FIG. 5 pressurized fluid supplied to port 292 is directed to all three of the ports 294, 296 and 298 so that pressurized fluid is supplied to ports 264, 266 and 268 of multi-position actuator 240 with the result that spool 222 of speed ratio clutch control valve 146 is shifted to the position shown in FIG. 3 so that pressurized fluid from groove 142 is directed to first speed ratio clutch 76, causing it to engage. Also, port 290 is connected to sump 36 via reduced diameter portion 311, passage 313, housing 270 and conduit 354. Now, by shifting spool 148 of direction control valve 140 downwardly to its next detent position, pressurized fluid is directed to groove 158 and hence to low range clutch 62, causing it to engage. With the engagement of low range clutch 62 transmission 14 will transmit power to provide a first speed forward.

In order to shift transmission 14 into second speed forward it is merely necessary for the operator to move control handle 274 in a counterclockwise direction, as shown in FIG. 5 to the next detent notch on plate 276, whereby spool 300 is moved downward slightly so that pressurized fluid supplied to port 292 may now also be directed, via fluid passages 310 and 312, to groove 288 which connects with port 290. From port 290 the pressurized fluid is directed via fluid conduit 188 to port 186 of fluid actuator 180 causing spool 172 of range control valve 166 to move downwardly so that pressurized fluid is now redirected to groove 170 and hence to high range clutch 56, causing it to engage, low range clutch 62, at the same time, disengaging. With the engagement of high range clutch 56 and the disengagement of low range clutch 62 transmission 14 will transmit power in a second forward speed.

In order to shift transmission 14 into third forward speed the operator simply moves control handle 274 further in a counterclockwise direction to the next detent notch which causes spool 300 to move slightly further downward in bore 286 so that now land 309 moves past port 298 so that it is no longer supplied with pressurized fluid from port 292, but rather is placed in communication by way of reduced diameter portion 307 with the interior of housing 270 which drains back to sump 36 by way of a fluid conduit 354. The result of this is that pressurized fluid is no longer supplied to bore 244 of actuator 240 between pistons 246 and 248, and so spring 238 causes spool 222 to move upwardly until piston 246 abuts the adjacent end of bifurcated portion 256 of piston 248. As was previously described, when spool 222 is in this position second speed ratio clutch 78 is engaged. Also, when spool 300 is in the third speed position port 290 is in communication with the interior of housing 270 via groove 288 and fluid passages 320, 318 and 326, and hence with sump 36 via conduit 354. Thus, range valve 166 is in the position shown in FIG. 3 and low range clutch 62 is engaged.

In order to shift into fourth speed forward, the operator again moves control handle 274 slightly further in a counterclockwise direction to the fourth detent position, spool 300 being caused to move slightly further downwardly in bore 286 so that now fluid supply port 292 is again connected to port 290 via fluid passages 310 and 314. This causes actuator 180 to move spool 172 of range control valve 166 downwardly so that low range clutch 62 is disengaged and high range clutch 56 is engaged, as explained shortly hereinbefore.

Further counterclockwise movement of control handle 274 to succeeding ones of the detent positions will cause continued downward movement of spool 300 in bore 286 of master control valve 282 which will result in a similar sequence of engagement and disengagement of the remaining speed ratio clutches and the range clutches.

Downshifting of transmission 14 is accomplished simply by moving control handle 274 in a clockwise direction, as shown in FIG. 5, which, of course, reverses the sequence of engagement and disengagement of the range clutches and the various speed ratio clutches.

In order to obtain first speed reverse drive control handle 274 may be disposed in either the first or second detent position, since in either position pressurized fluid is supplied to all three ports 264, 266 and 268 of multi-position actuator 240 so that spool 222 of speed ratio clutch control valve 146 is located as shown in FIG. 3. Next it is necessary to actuate spool 148 of direction control valve 140 upwardly, as shown in FIG. 3, so that groove 134 is placed in communication with groove 156, whereby pressurized fluid may be supplied to reverse clutch 72, causing it to engage. At this point it will be noted that shifting spool 148 upwardly for reverse drive prevents pressurized fluid from being supplied to range control valve 166 pressurized fluid cannot be supplied to either one of range clutches 56 and 62.

In order to shift transmission 14 into second speed reverse its is now necessary merely to actuate control handle 274 in a counterclockwise direction to the third or fourth detent position which causes spool 300 of master control valve 282 to move downwardly to a point at which land 309 cooperates with port 298 to vent back to sump 236 through housing 270. As a result spring 238 moves spool 222 of speed ratio clutch control valve 146 upwardly until piston 246 abuts the adjacent end of bifurcated portion 256 of piston 248. With spool 222 in this position pressurized fluid is now directed to second speed ratio clutch 78, causing it to disengage, while first speed ratio clutch 76 disengages since pressurized fluid is no longer being directed to it.

Third speed reverse is obtained by moving control handle 274 to the fifth or sixth detent position in which case spool 300 is moved downwardly sufficiently so that land 309 cooperates with port 296 to vent it to sump 36, whereby actuator 240 permits spring 238 to move spool 222 to the third position in which pressurized fluid is directed to third speed ratio clutch 80, causing it to engage. Similarly, fourth speed reverse is obtained by further movement of control handle 274 to the seventh or eighth detent position which results in spool 300 moving further downwardly so that land 309 cooperates with port 394 to vent it back to sump 36. The result of this is that actuator 240 permits spring 238 to move spool 222 of speed ratio clutch control valve to the fourth position in which pressurized fluid is directed to fourth speed ratio clutch 82, causing it to engage.

The above detailed description of my control system and the components thereof is intended to be illustrative only, and should not be considered as limiting my invention to any particular embodiment, since it is possible to make numerous modifications and changes without departing from the spirit and scope of my invention. For example, my control system can easily be applied to a transmission having more or less speeds in either forward or reverse. Also, the number of positions in which actuator 240 will maintain the spool 222 may be varied by simply adding or deleting pistons.

I claim:

1. For use with a source of pressurized fluid and a transmission having a plurality of fluid actuated clutches connectible to the source of pressurized fluid for engaging the various gear trains therein, a control system comprising a speed ratio control valve movable between a first position in which a first one of the clutches is connected to the source of pressurized fluid and a second position in which a second one of the clutches is connected to the source of pressurized fluid, first fluid actuated means connected to said valve for moving said valve between said positions, a range control valve movable between a low range position in which a third one of the clutches is connected to the source of pressurized fluid and a high range position in which a fourth one of the clutches is connected to the source of pressurized fluid, second fluid actuated means connected to said range control valve for moving said range control valve between said low and high range positions, and a master control valve connected to the source of pressurized fluid and said first and second means, said master control valve being operable to connect said first and second means to the source of pressurized fluid so that said speed ratio control valve is in said first position and said range control valve is in said low range position, said speed ratio control valve is in said first position and said range control valve is in said high range position, said speed ratio control valve is in said second position and said range control valve is in said low range position or said speed ratio control valve is in said second position and said range control valve is in said high range position.

2. For use with a source of pressurized fluid and a transmission having a plurality of fluid actuated clutches connectible to the source of pressurized fluid for engaging various gear trains therein, a control system comprising a speed ratio control valve movable between a first position in which a first one of the clutches is connected to the source of pressurized fluid and a second position of which a second one of the clutches is connected to the source of pressurized fluid, first means connected to said valve for moving said valve between said positions, a range control valve movable between a low range position in which a third one of the clutches is connected to a source of pressurized fluid and a high range position in which a fourth one of the clutches is connected to the source of pressurized fluid, second means connected to said range control valve for moving said range control valve between said low and high range positions, and master control means connected to said first and second means, said master control means being operable to actuate said first and second means so that said speed ratio control valve is in said first position and said range control valve is in said low range position, said speed ratio control valve is in said first position and said range control valve is in said high range position, said speed ratio control valve is in said second position and said range control valve is in said low range position or said speed ratio control valve is in said second position and said range control valve is in said high range position.

3. For use with a transmission having a plurality of fluid actuated clutches connectible to a source of pressurized fluid for engaging various gear trains therein, a control system comprising a speed ratio control valve movable between a first position in which a first one of the clutches is engaged and a second position in which a second one of the clutches is engaged, first means connected to said valve for moving said valve between said positions, a range control valve movable between a low range position in which a third one of the clutches is engaged and a high range position in which a fourth one of the clutches is engaged, second means connected to said range control valve for moving said range control valve between said low and high range positions, and master control means including a control handle movable only in one direction and one plane to actuate the said first and second means so that said speed ratio control valve is in said first position and said range control valve is in said low range position, then said speed ratio control valve remains in said first position and said range control valve shifts to said high range position, then said speed ratio control valve shifts to said second position and said range control valve shifts to said low range position and then said speed ratio control valve remains in said second position and said range control valve shifts to said high range position.

4. For use with a multi-speed transmission having a low range clutch, a high range clutch and a plurality of speed ratio clutches, a control system comprising first means for engaging the low range clutch, second means for engaging the high range clutch, third means for engaging different ones of the speed ratio clutches, and master control means connected to said first, second and third means and operable to actuate said first, second and third means so that the low range clutch and a first one of the speed ratio clutches are engaged, the high range clutch and said first speed ratio clutch are engaged, the low range clutch and a second one of the speed ratio clutches are engaged, or the high range clutch and said second speed ratio clutch are engaged.

5. For use with a multi-speed transmission having low and high range clutches and first and second speed ratio clutches, a control system comprising means for engaging the low range clutch, means for engaging the high range clutch, means for engaging the first speed ratio clutch, means for engaging the second speed ratio clutch, and master control means including a control handle movable in a single plane only, said master control means being connected to said engaging means and operable to actuate said engaging means upon movement of said handle in a given direction so that from an initial condition in which the low range and first speed ratio clutches are engaged, a first increment of movement of said handle causes disengagement of the low range clutch and engagement of the high range clutch, a second increment of movement of said handle causes disengagement of the first speed ratio and high range clutches and engagement of the second speed ratio and low range clutches, and a third increment of movement of said handle causes disengagement of the low range clutch and engagement of the high range clutch.

6. For use with a multi-speed transmission having high and low range fluid actuated forward clutches, first and second fluid actuated speed ratio clutches and a fluid actuated reverse clutch and a source of pressurized fluid, a control system comprising a direction control valve and a range control valve, said direction control valve being connected to the pressurized fluid source and movable between a reverse position in which pressurized fluid is supplied to the reverse clutch for engaging it, a forward position in which pressurized fluid is supplied to said range control valve and a neutral position in which pressurized fluid is supplied to neither the reverse clutch nor said range control valve, said range control valve being movable between a low range position in which pressurized fluid from said direction control valve is supplied to the low range forward clutch for engaging it and a high range position in which pressurized fluid from said direction control valve is supplied to the high range forward clutch for engaging it.

7. A control system as set forth in claim 6 and including a speed ratio clutch control valve connected to the pressurized fluid source, said speed ratio clutch control valve being movable between a first speed ratio position in which pressurized fluid is supplied to the first speed ratio clutch for engaging it and a second speed ratio position in which pressurized fluid is supplied to the second speed ratio clutch for engaging it.

8. For use with a multi-speed transmission having first and second range fluid actuated forward clutches, first and second fluid actuated speed ratio clutches and a fluid actuated reverse clutch and a source of pressurized fluid, a control system comprising a direction control valve, a range control valve, said direction control valve being connected to the pressurized fluid source and movable between a first position in which pressurized fluid is supplied to the reverse clutch for engaging it, a forward position in which pressurized fluid is supplied to said range control valve and a neutral position in which pressurized fluid is supplied to neither the reverse clutch nor said range control valve, said range control valve being movable between a first range position in which pressurized fluid from said direction control valve is supplied to the first range forward clutch for engaging it and a second range position in which pressurized fluid from said direction control valve is supplied to the second range forward clutch for engaging it, a speed ratio clutch control valve connected to the pressurized fluid source, said speed ratio clutch control valve being movable between a first speed ratio position in which pressurized fluid is supplied to the first speed ratio clutch for engaging it and a second speed ratio position in which pressurized fluid is supplied to the second speed ratio clutch for engaging it, resilient means for biasing said range control valve to said first range position, first pressurized fluid operated means for moving said range control valve to said second range position, resilient means for biasing said speed ratio clutch control valve to said second ratio position, second pressurized fluid operated means for moving said speed ratio clutch control valve to said first speed ratio position, and a master controller for coordinating energization of said first and second moving means, said controller being connected to the pressurized fluid source and operable so that in a first position pressurized fluid is supplied only to said second moving means, in a second position pressurized fluid is supplied to both said first and second moving means, in a third position pressurized fluid is supplied to neither said first nor said second moving means and in a fourth position pressurized fluid is supplied only to said first moving means.

9. For use with a multi-speed transmission having low and high range fluid actuated forward clutches, first and second fluid actuated speed ratio clutches and a fluid actuated reverse clutch and a source of pressurized fluid, a control system comprising a direction control valve, a range control valve, said direction control valve being connected to the pressurized fluid source and movable between a reverse position in which pressurized fluid is supplied to the reverse clutch for engaging it, a forward position in which pressurized fluid is supplied to said range control valve and a neutral position in which pressurized fluid is supplied to neither the reverse clutch nor said range control valve, said range control valve being movable between a low range position in which pressurized fluid from said direction control valve is supplied to the low range forward clutch for engaging it and a high range position in which pressurized fluid from said direction control valve is supplied to the high range forward clutch for engaging it, a speed ratio clutch control valve connected to the pressurized fluid source, said speed ratio clutch control valve being movable between a first speed ratio position in which pressurized fluid is supplied to the first speed ratio clutch for engaging it and a second speed ratio position in which pressurized fluid is supplied to the second speed ratio clutch for engaging it, first means for moving said range control valve between said low and high range positions, second means for moving said speed ratio control valve between said first and second speed ratio positions, and master controller means operatively connected to said first and second moving means for coordinating operation of said first and second moving means so that in a first position the low range forward clutch and the first speed ratio clutch are engaged, in a second position the high range forward clutch and the first speed clutch are engaged, in a third position the low range forward clutch and a second speed ratio clutch are engaged and in a fourth position the high range forward clutch and the second speed ratio clutch are engaged.

10. For use with a multi-speed transmission having low and high range fluid actuated forward clutches, first, second, third and fourth fluid actuated speed ratio clutches and a fluid actuated reverse clutch and a source of pressurized fluid, a control system comprising a direction control valve, a range control valve, said direction control valve being connected to the pressurized fluid source and movable between a reverse position in which pressurized fluid is supplied to the reverse clutch for engaging it, a forward position in which pressurized fluid is supplied to said range control valve and a neutral position in which pressurized fluid is supplied to neither the reverse clutch nor said range control valve, said range control valve being movable between a low range position in which pressurized fluid from said direction control valve is supplied to the low range forward clutch for engaging it and a high range position in which pressurized fluid from said direction control valve is supplied to the high range forward clutch for engaging it, a speed ratio clutch control valve connected to the pressurized fluid source, said speed ratio clutch control valve being movable between first, second, third and fourth positions in which pressurized fluid is supplied to the first, second, third and fourth speed ratio clutches, respectively, for engaging them, resilient means for biasing said range control valve to said low range position, a first pressurized fluid operated actuator for moving said range control valve to said high range position, resilient means for biasing said speed ratio clutch control valve to said fourth position, a multi-position fluid operated actuator for moving said speed ratio clutch control valve between said four positions, said mutli-position actuator including a body, a bore having a closed end in said body, a first piston slidably disposed in said bore, a second piston slidably disposed in said bore between said first piston and said closed end, a third piston slidably disposed in said bore between said second piston and said closed end, first, second and third fluid ports in said body which communicate with said bore between said first and said second pistons, between said second and third pistons and between said third piston and said closed end, respectively, and first, second and third stop means for limiting movement of said first, second and third pistons, respectively, in a direction away from said closed end so that when pressurized fluid is supplied to said third fluid port said speed ratio clutch control valve is moved to said first position, when pressurized fluid is supplied to said second fluid port and is not supplied to said third fluid port said speed ratio clutch control valve is moved to said second position, when pressurized fluid is supplied only to said first fluid port said speed ratio clutch control valve is moved to said third position and when pressurized fluid is supplied to none of said fluid ports said speed ratio clutch control valve is moved to said fourth position, and a master controller connected to the pressurized fluid source, said first actuator and said ports and operable to coordinate the supply of pressurized fluid to said first actuator and to said ports so that said speed ratio clutches can be engaged in sequence from the lowest speed to the highest speed while the sequence of engaging said low range forward clutch and then said high range forward clutch during engagement of each speed ratio clutch is repeated.

References Cited
UNITED STATES PATENTS

| | | | |
|---|---|---|---|
| 2,943,500 | 6/1960 | Wittren | 74—364 |
| 3,078,673 | 2/1963 | Browning et al. | 74—364 |
| 3,181,385 | 5/1965 | Siler | 74—360 |

DONLEY J. STOCKING, *Primary Examiner.*

DAVID J. WILLIAMOWSKY, *Examiner.*

H. S. LAYTON, *Assistant Examiner.*

UNITED STATES PATENT OFFICE
CERTIFICATE OF CORRECTION

Patent No. 3,344,679                        October 3, 1967

Burton S. Zeller

It is hereby certified that error appears in the above numbered patent requiring correction and that the said Letters Patent should read as corrected below.

Column 1, line 57, for "transmision" read -- transmission --; column 2, line 21, for "casing a" read -- casing of --; line 52, for "clucth" read -- clutch --; column 4, line 17, for "directly" read -- directing --; line 44, for "egnaging" read -- engaging --; column 7, line 11, for "desirable" read -- desired --; column 8, line 27, after "166" insert -- , and so regardless of the position of spool 172 of range control valve 166 --; line 35, after "vent" insert -- it --.

Signed and sealed this 22nd day of October 1968.

(SEAL)
Attest:

Edward M. Fletcher, Jr.                              EDWARD J. BRENNER
Attesting Officer                                      Commissioner of Patents